(No Model.)

C. H. C. KOCH.
SELF OILING DEVICE FOR JOURNALS.

No. 591,406. Patented Oct. 12, 1897.

Witnesses.
E. T. Wray.
Donald M. Carter.

Inventor
Christian H. C. Koch,
by Francis W. Parker
his Atty.

UNITED STATES PATENT OFFICE.

CHRISTIAN H. C. KOCH, OF CHICAGO, ILLINOIS, ASSIGNOR TO THE CHICAGO LUBRICATING AND MANUFACTURING COMPANY, OF ILLINOIS.

SELF-OILING DEVICE FOR JOURNALS.

SPECIFICATION forming part of Letters Patent No. 591,406, dated October 12, 1897.

Application filed July 20, 1896. Serial No. 599,959. (No model.)

*To all whom it may concern:*

Be it known that I, CHRISTIAN H. C. KOCH, a citizen of the United States, residing at Chicago, in the county of Cook and State of Illinois, have invented certain Improvements in Self-Oiling Devices for Journals, of which the following is a specification.

My invention relates to oiling devices for journals, and has for its object to provide a new and improved device which may be easily and quickly removed from and inserted into the journal-box, and which when in position will insure continuous lubrication of the journal.

My invention is illustrated in the accompanying drawings, wherein—

Figure 1:
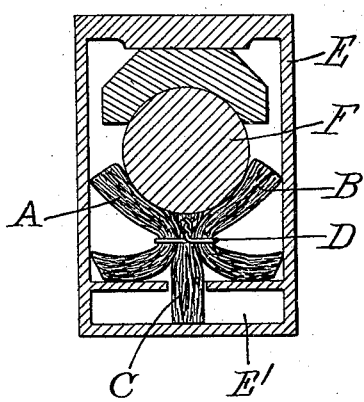
Figure 2:
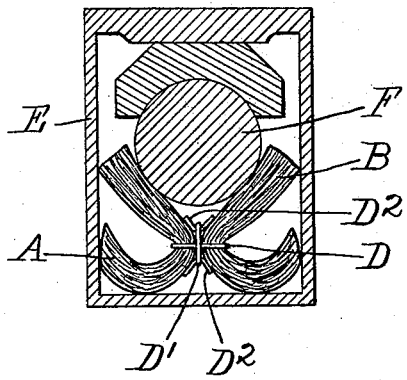
Figure 3:
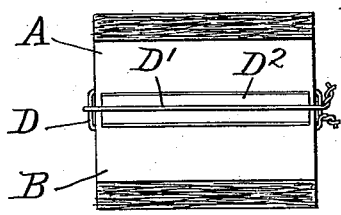
Figure 4:
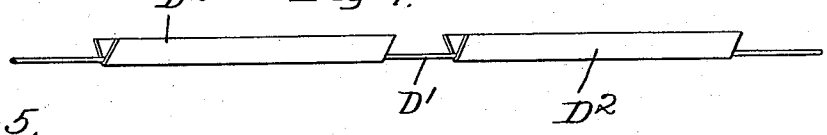
Figure 5:
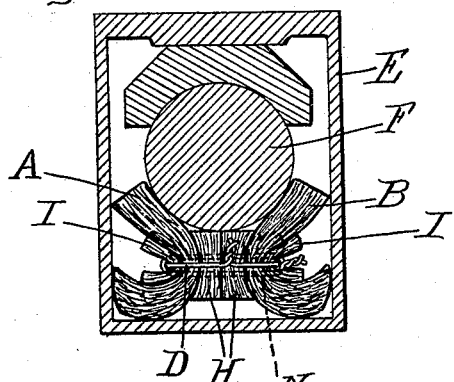
Figure 6:
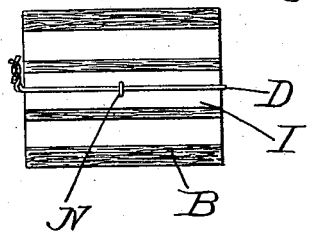

Figure 1 is a view of a journal-box provided with my oiling device. Fig. 2 is an end view of my device, showing a somewhat different construction. Fig. 3 is a plan view of the same. Fig. 4 is a detail view of one of the binding-wires. Fig. 5 is an end view of a modified form of my device. Fig. 6 is a side view of the same.

Like letters refer to like parts throughout the several figures.

It has in practice been found very difficult to continuously lubricate journals—such, for example, as railway-car journals, street-car journals, and the like—without using somewhat complicated and extremely expensive mechanisms.

The object of my invention is to provide a simple, cheap, and efficient oiling device which may be used in connection with car-journals or other journals as they are now constructed, and which may be easily and quickly placed in position, the oiling device being so constructed that when placed in position a continuous lubrication of the journal is assured.

My lubricating device is made up of a series of pieces of felt or the like, bound or held together, so that when placed in the journal-box these pieces of felt or the like will be self-supporting, so as to be kept in contact with the journal, and will conduct the oil from the box to such journal, so as to assure a continuous lubrication.

Referring now to Fig. 1, I have shown my oiling device as consisting of the two pads A and B, having a central pad C interposed between the two outer pads, the whole being bound together by the encircling piece D, which may be of wire or of any other suitable material. This pad is placed in the journal-box E and comes in contact with the journal F, as shown. In Fig. 1 I have illustrated a street-car journal and box provided with the cup E', into which the central piece C projects, said piece acting as a wick to conduct the oil to the journal. It will be noticed that with my arrangement the fibers of the felt or other material run up and down or substantially vertical, thereby insuring a free passage of the oil from the journal-box to the journal. I also prefer to have this central pad so that its upper end comes in contact with the journal.

In Fig. 2 the two pads A and B are connected together by the encircling piece or wire D, and a second wire D' passes between the pads, as shown. The binding-wire D' also passes around the two strengthening-pieces $D^2$ $D^2$, which may be of tin or other suitable material. As shown in Fig. 2, these strengthening-pieces consist of V-shaped troughs, and they tend to separate the edges of the pad.

In Fig. 5 I have shown the two pads A and B, having interposed between them two additional pads H, which act as wicks to conduct the oil to the journals. These pads H may be made of such length that they will come in contact with the bottom of the journal-box when the pad is in position. Outside of the pads A and B, I have shown the strengthening-pieces I I, which may be of felt or other material. The construction shown in Fig. 5 is preferably used in connection with journals requiring a large amount of oil and provided with large boxes—such, for example, as locomotive-journals. The sides of the pads may come in contact with the sides of the box, and thus aid in supporting the pads and keeping them in position. The length or size of the intermediate pad or pads may be varied at will, such size depending upon the results desired and the configuration of the journal-box.

In the drawings I have shown the pads as bound together by a binding device which surrounds them; but I may sew them together with cord or wire or other suitable material. I prefer to bind these pads together with some strong material, such as wire or cord, so that it may be used in removing the pads from the journal-box and inserting such pads therein. If, for example, the binding device is made of wire, the pads will be made stiff, so that they may be easily pushed into the journal-box without forcing the pads out of shape.

In many cases it takes a heavy pressure to force the pad into its proper place for service, and since the pads are flexible they must be provided with a stiffening device, so that they can be forced into position beneath the journal by applying pressure to one end. If the pads are not provided with this stiffening device, they cannot be placed in position under such conditions unless the wheels of the cars are removed. Since it is impracticable to remove the wheels simply to insert this pad, it follows that the pads must be provided with a stiffening device and be constructed so they can be forced into position by pressure applied at one end. This stiffening device, which is, preferably, also the binding device, may be used in removing the pad from the box, such stiffening device being engaged by a hook when it is desired to remove the pad.

When the intermediate pads are used, the ends of the pads are in contact with the journal, and hence the oil is conveyed directly along the fibers of the pads from the oil-reservoir to such journal.

I have described these several parts in detail, but it is evident that they may be varied in form, construction, and arrangement without departing from the spirit of my invention, and I therefore do not wish to be limited to the construction shown.

The central part C of Fig. 1 may be shortened in the absence of the cup E'. The stiffened parts I I may be used with any form of the device.

I prefer to insert a binding device N through the pad, as shown in Figs. 5 and 6, in order to hold the pads together. This binding device may be of any suitable construction. As shown in the drawings, it consists of a staple or loop of wire passed through the pads, the binding device D coming beneath this staple and the ends of the staple being fastened together, so as to prevent its removal. I prefer to use this binding device on all of the pads, but of course it may be omitted, if desired.

As shown in Fig. 5, the lower ends of the pads A and B are doubled up, so as to come in contact with the strengthening-pieces I I. The pad shown in Fig. 5 has a large surface in contact with the journal.

The use and operation of my invention are as follows:

After the pads are connected together they are inserted into the journal-box, the edges of the outer pads being separated, so that the journal comes between the pads. The elasticity of the pads now tends to bring the edges together and keep the pads in contact with the journal. The oil in the bottom of the journal-box soaks into the pads and is conveyed along the fibers thereof to the journal, which will be continuously lubricated. There is practically no wear upon the pads, as they need only bear lightly against the journal. This oiling device may be inverted when desired, and hence is equivalent to two lubricating devices combined in one. The ends of the fibers when central pads are used are in contact with the journal, and hence the oil conveyed along the fibers will be more readily conveyed to the journal. When it is desired to remove this lubricating device, a hook or the like may be inserted beneath the binding-wires and the pads easily and quickly drawn out of the journal-box. This oiling device, it will be seen, is self-supporting and is constantly kept in contact with the journal without the agency of extraneous devices or mechanism.

It will be seen that I have here a device which can be made at a very little cost, which can be easily handled, and which will insure a continuous lubrication of the journal, the oiling device being complete in itself and needing no extraneous parts in order to keep it in contact with the journal.

The pad is intended for the most part to be reversible, though some of the features of my invention can be retained in a pad which is not reversible. In some of the forms of my invention a portion of the lubricator carrying fibrous material is arranged to lie tangentially to the part to be lubricated—that is, so that its fibers lie along or tangentially to the exterior of the journal while other parts of the fibrous material have their fibers projecting radially. I have spoken of a binding-wire or the like to inclose the parts. Generally speaking I mean by this a binder or a part the face of which is to hold the other parts together and not specifically to support them by thus resting upon some fixed part, as is the case with a supporting-frame.

I claim—

1. As a new article of manufacture a self-contained lubricating device composed of a series of flexible fibrous oil-receiving conducting portions, a metallic binding, and stiffening device to hold the fibrous portions closely together, said binding and stiffening device being wholly within the outer boundary of the finished lubricating device, so that it will not come in contact with any part of the journal-box and so rigid as to enable the lubricating device to be forced into the journal-box endwise without injuriously bending the device or displacing the fibrous portions such fibrous portions so firmly bound together as to be capable of standing alone when placed in the box and saturated with oil.

2. A lubricating device for journals adapted to be removed from and inserted into the journal-box and comprising a series of pad portions adapted to be saturated with oil, a binder passing around said pad portions near their middle so as to make the device reversible, a strengthening-piece outside the pad portions and inclosed by the binder so as to strengthen the pad portions and render the use of a supporting-frame unnecessary.

3. A lubricating device for journals adapted to be removed from and inserted into the journal-box and comprising two pad portions adapted to be saturated with oil, a binder passing around said pads near their middle so as to make the device reversible, a strengthening-piece outside the pad portions and inclosed by the binder so as to strengthen the pad portions and render the use of a supporting-frame unnecessary, and an intermediate fibrous portion between the two pad portions.

4. A lubricating device comprising two fibrous pads of approximately the same length and of such length that their upper ends engage the axle tangentially, while their lower ends lie upon the floor of the box, an intermediate short fibrous portion whose upper end engages the axle radially, a binder surrounding the fibrous parts about midway and holding them securely together so that the device is reversible and needs no supporting-frame.

5. A lubricating device comprising two fibrous pads of approximately the same length and of such length that their upper ends engage the axle tangentially, while their lower ends lie upon the floor of the box, an intermediate short fibrous portion whose upper end engages the axle radially, a binder surrounding the fibrous parts about midway and holding them securely together so that the device is reversible and needs no supporting-frame, and strengthening parts outside the lubricating device proper, held in position by the binder and adapted to strengthen the outside fibrous pad portions and hold them in position.

6. In a car-axle-lubricating device, the combination of an axle-box with an axle therein, and a lubricating-pad, comprising two outer pad portions of substantially the same length, the upper end of each bearing upon the axle tangentially, and the lower end being rolled up against the bottom and sides of the box, intermediate short vertical fibrous parts of a length approximately equal to the distance between the axle and the bottom of the box and bearing radially against the axle, and a binder which surrounds the parts midway, thus making the device reversible and securely holding them together, thus avoiding the necessity of a supporting-frame for the lubricating device.

June 25, 1896.

CHRISTIAN H. C. KOCH.

Witnesses:
 FRANCIS W. PARKER,
 LILLEY W. JOHNSTONE.